(12) United States Patent
Craven

(10) Patent No.: US 8,082,005 B1
(45) Date of Patent: *Dec. 20, 2011

(54) METHOD AND SYSTEM FOR USING AN INTEGRATED SUBSCRIBER IDENTITY MODULE IN A NETWORK INTERFACE UNIT

(75) Inventor: Jeffrey A. Craven, Cumming, GA (US)

(73) Assignee: ARRIS Group, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/768,348

(22) Filed: Apr. 27, 2010

Related U.S. Application Data

(60) Division of application No. 11/733,675, filed on Apr. 10, 2007, which is a continuation of application No. 10/409,334, filed on Apr. 7, 2003, now Pat. No. 7,218,915.

(60) Provisional application No. 60/370,832, filed on Apr. 7, 2002.

(51) Int. Cl.
*H04M 1/00* (2006.01)
(52) U.S. Cl. ........ 455/558; 455/406; 455/411; 455/466; 455/418; 455/419; 370/338
(58) Field of Classification Search .................. 370/338; 455/406, 411, 466, 418–419, 410
See application file for complete search history.

(56) References Cited

U.S. PATENT DOCUMENTS

| | | | | |
|---|---|---|---|---|
| 5,678,041 A | * | 10/1997 | Baker et al. | 1/1 |
| 6,014,561 A | * | 1/2000 | Molne | 455/419 |
| 6,104,928 A | * | 8/2000 | Waugh | 455/445 |
| 6,115,601 A | * | 9/2000 | Ferreira | 455/406 |
| 6,324,402 B1 | * | 11/2001 | Waugh et al. | 455/445 |
| 6,615,035 B1 | * | 9/2003 | Lucidarme et al. | 455/411 |
| 6,658,455 B1 | * | 12/2003 | Weinman, Jr. | 709/203 |
| 7,218,915 B2 | * | 5/2007 | Craven | 455/411 |
| 2001/0046850 A1 | * | 11/2001 | Blanke et al. | 455/411 |
| 2002/0071416 A1 | * | 6/2002 | Carlson et al. | 370/338 |
| 2003/0026432 A1 | * | 2/2003 | Woodward | 380/278 |
| 2003/0051041 A1 | * | 3/2003 | Kalavade et al. | 709/229 |
| 2003/0092444 A1 | * | 5/2003 | Sengodan et al. | 455/436 |
| 2003/0182560 A1 | * | 9/2003 | Brizek | 713/189 |
| 2003/0190908 A1 | * | 10/2003 | Craven | 455/411 |
| 2004/0038700 A1 | * | 2/2004 | Gibbs | 455/522 |
| 2005/0003837 A1 | * | 1/2005 | Midkiff et al. | 455/466 |
| 2005/0176466 A1 | * | 8/2005 | Verloop et al. | 455/558 |
| 2005/0255885 A1 | * | 11/2005 | Majewski et al. | 455/558 |
| 2008/0254766 A1 | * | 10/2008 | Craven | 455/407 |

FOREIGN PATENT DOCUMENTS

| | | | |
|---|---|---|---|
| EP | 706278 A2 | * | 4/1996 |
| GB | 2365699 A | * | 2/2002 |

* cited by examiner

*Primary Examiner* — Charles Shedrick
(74) *Attorney, Agent, or Firm* — Troy A. Van Aacken; Robert J. Starr

(57) ABSTRACT

Subscriber-associated authentication, authorization and policy control information can be stored on a SIM (preprogrammed or user programmed), thereby facilitating grant or denial of access to services at an NIU while the programmed SIM or virtual SIM resides in the NIU. A provider can store a message in the SIM based on a payment, which determines the level and period of services to be provided. The SIM can be removed and used at any of a plurality of NIUs, thereby facilitating payment for the services following the SIM.

7 Claims, 3 Drawing Sheets

METHOD AND SYSTEM FOR USING AN INTEGRATED SUBSCRIBER IDENTITY MODULE IN A NETWORK INTERFACE UNIT

CROSS REFERENCE

This application is a divisional of, and claims priority to Craven, U.S. patent application Ser. No. 11/733,675, entitled, "Method and System for Using an Integrated Subscriber Identity Module in a Network Interface Unit," filed Apr. 10, 2007, which is hereby incorporated by reference in its entirety, and is a continuation of U.S. patent application Ser. No. 10/409,334, entitled "Method and System for Using an Integrated Subscriber Identity Module in a Network Interface Unit," filed Apr. 7, 2003, which is hereby incorporated by reference in its entirety, and which is a utility of U.S. Provisional Patent Application Ser. No. 60/370,832, entitled "Network Interface Unit (NIU) with Integrated Subscriber Interface Module (SIM)," which was filed Apr. 7, 2002, and is incorporated herein by reference in its entirety.

FIELD

The present disclosure relates to authorization for network communication systems.

BACKGROUND

Subscriber Identity Module ("SIM") (sometimes referred to as a subscriber interface module) technology, which is known in the art, has been used in mobile phone systems to allow users to establish account information in cellular telephones. For example, if a particular user has a first phone, and then buys another one, a SIM card can be removed from the first phone and inserted into the second one, thereby allowing account authentication, authorization and policy control information, as well as billing information, to be transferred from one phone to the next without the need of canceling the account corresponding to the first phone and then having to establish another account for the second phone. Examples of SIM-stored data include identity and billing information of the consumer, ongoing pre-paid usage totals, account and usage history, allowable access criteria, other information necessary for network usage and consumer favorites.

In addition to mobile telephone systems, other communication systems associate accounts that correspond to a particular user, in order to facilitate access and billing of the customer. Examples of such services include cable television, wired or wireless telephony, high-speed data and or multimedia services, for which a user typically establishes an account with the provider of each service. The signals for these services, which may be provided by as many different providers as there are services, typically enter into a dwelling or place of business via a customer premises Network Interface Unit ("NIU"). An NIU typically interfaces each of these services to a single dwelling unit ("SDU") or a multiple dwelling unit ("MDU"), or a single converged services portal may receive signals from a plurality of service providers. Furthermore, these services may all be provided via a single service provider via a single network source such as, for example, xDSL, FTTx, HFC, fixed wireless, etc, in which case the converged services portal would be used.

Each one of the services may require that a separate account be established corresponding thereto. This requires either speaking with a representative of each service provider separately to establish the account with that a particular provider, or at the least, establish an account online, providing credit card information to the provider so that service level packaging, billing and related procedures can be agreed upon and established. Although this can be burdensome for a homeowner having just moved in to a new residence, many people realize such procedures are a one-time affair, and after the pain is over, tend to forget about the inconvenience. Until it is time to move again; or until they decide to buy a second home, such as a retreat in the mountains or a house on a beach.

In addition, in today's mobile economy, many people work temporary jobs at locations for durations less than a year, often working at many different locations for a few weeks each during the course of a year. Or, people who have timeshare arrangements in resort locations also tend to desire telephone, data and television services. One of the first things one does upon establishing such a new residence is to set up accounts for desired communication services at the new location(s). One can see that after a while, the account establishing process become a real burden. Either they must use the services that are currently established at the particular location, often paying premium rates for limited services, or they must establish their own accounts for such services. In addition, the setup and account activation costs are prohibitive in comparison to the monthly service rates.

Accordingly, there is a need for a method and system to allow the establishment of authentication, authorization and policy management of one information/services account, and for each of the desired services within the account, such that account subscription and billing information can follow the user, thereby allowing the user to access the subscribed services from a plurality of locations without the need of establishing an account or accounts at each location.

SUMMARY

It is an object to provide a method and system that allows the transporting and handling of user-account authentication, authorization and policy control information user communications subscription account information from one location to another without the user having to establish a new and different account at each location. A user can establish one or more accounts corresponding to one or more services, and store that account information on a SIM device, such as a card. The card can then be used in one or more NIU devices that may be located at different locations, one being located at a primary residence, one at a secondary residence, another at a temporary job location and yet another at a vacation resort location. Thus, by transferring the card from one NIU to another, the user will have access to all of the subscribed-to services at each of the locations, and will not have to establish new accounts for services at the various locations. By simply removing a device the size of a credit card from one NIU, transporting it to another, and then inserting it into the other NIU, the user can quickly and easily enjoy all of the services for which he or she has subscribed, without having to establish accounts for the same at each location. Furthermore, a single bill for all the services, or at least a single bill for each one of the services without the need for two or more telephone bills, two or more cable television bills, etc., would greatly reduce the number of bills to keep track of and have to pay each billing cycle, which would probably not be coterminous.

DETAILED DESCRIPTION

As a preliminary matter, it will be readily understood by those persons skilled in the art that the present disclosure should be read broadly, and is thereby susceptible of broad utility and application. Many methods, embodiments and adaptations of thus disclosure other than those herein described, as well as many variations, modifications, and equivalent arrangements, will be apparent from or reasonably suggested by the present disclosure and the following description thereof, without departing from the substance or scope of the present disclosure.

Accordingly, while this disclosure has been described herein in detail in relation to preferred embodiments, it is to be understood that this disclosure is only illustrative and exemplary of this disclosure and is made merely for the purposes of providing a full and enabling disclosure. The following disclosure is not intended nor is to be construed to limit the claims or otherwise to exclude other embodiments, adaptations, variations, modifications and equivalent arrangements.

Figure 1:
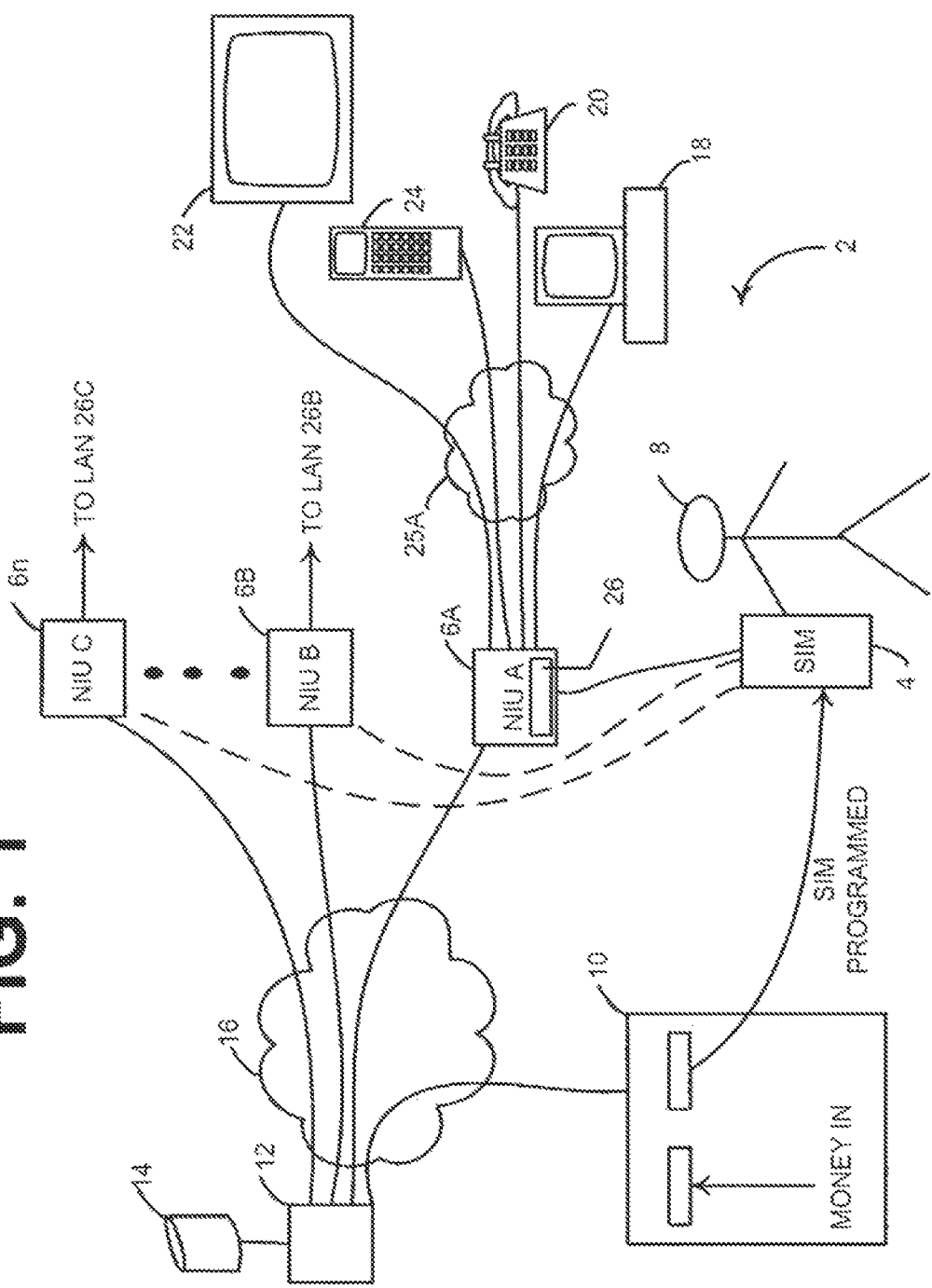
FIG. 1 illustrates a system for facilitating transporting user account information from one location to another to obtain desired services at a plurality of locations using a SIM card.

Turning now to the figures, FIG. 1 illustrates a system 2 for using a SIM device 4, such as in the form of a card (it will be appreciated that the other forms may be implemented, including a virtual version where account information is downloaded from a provider's server or determined via personal physical identity, such as, for example, a fingerprint or other biometric means known in the art), for transporting account information related to communication services from one to another among a plurality of NIUs 6. A user 8 obtains SIM 4 from a variety of means, preferably from a SIM vending machine 10 that dispenses or reprograms a renewable SIM card when requested services are selected and an appropriate amount of money is inserted into the machine, the amount corresponding to the type and level of selected services.

The SIMs 4 primary function is the handling of the activation, deactivation, maintenance and conditional access of the services and sub-level services supplied via NIU 6. Information stored in SIM 4 in support of these services can vary with varying degrees of service functionality. For example, SIM 4 can support high-level services, such as telephony, as well as sub-level services such as caller ID. Other examples of services and sub-level services include: telephony/parental control, multimedia/ppv and multimedia/favorites, among others. Examples of data stored on SIM 4 are identity and relative billing information of user 8, ongoing pre-paid usage totals, account and usage history, allowable access criteria, other network usage information known in the art and consumer/user favorites.

SIM 4 can be loaded with user-specific information at a location remote from NIU 6, such as vending machine 10, or can be loaded with information that facilitates a procedure via the NIU to communicate with external systems (e.g. activation systems) for programming user-specific information. In addition, SIM 4 can provide management of data used by the NIU related to access, credit, system security, etc. (i.e. subscriber authentication and speech encryption keys, etc.) Examples of services facilitated include, but are not limited to, controlled and automated activation, automated deactivation, pre-paid debit processing rental service credit control, parental control applications, encryption, favorite lists and tier-packaging (i.e., class of service). In addition, user 8 can have access to the data stored on SIM 4 via the stroke of a few keys on a telephone keypad or a TV/PC screen, for example.

When services have been selected and paid for, the vending machine 10 either ejects a new SIM card 4 with authorization for the selected services encoded thereon, or ejects a previously used and inserted card that has been reprogrammed/renewed. A user would preferably have incentive to reuse cards, as the amount of money inserted into the vending machine 10 would be lower than if a new card was programmed and ejected by the machine.

The vending machine 10 preferably has a user interface, such as a computer monitor, and means for inputting information thereto, such as, for example, a keyboard or the computer monitor that may be designed for touch sensitive data entry, both technologies being known in the art. The user selects the services he desires from a list of services offered by providers the operator of the vending machine 10 has agreements with, and the final cost of the generating or reprogramming is shown before the user selects a button that authorizes the programming charges. These charges may be charges to a credit card that the user enters into machine 10, or, based on a username and password, the predetermined credit account may be automatically billed, or the user may choose to input cash into the machine. In addition, instead of programming or reprogramming a physical card, the service provider may authorize or reauthorize services based on the amount of money provided to machine 10, and in response to an identifier, entered by the user, that corresponds to the users device. It will be appreciated that SIM card 4 may have a unique identifier, such as a serial number, that identifies the card, or other SIM device, to the provider's server, rather than having the user input a user name and password, or other identifying information.

When the programming charges have been authorized and/or paid, the SIM card 4 is programmed and the revised account information is stored to the selected service provider's central location, such as, for example, a head end or a central office. As known in the art, such a central location 12 may contain one or more server computers that store user information in a database 14. Thus, when a user attempts to access services through NIU 6, the head end 12 checks information extracted from SIM 4 at the NIU, against the same user's account information stored in database 14. If the account server at the head end 12 determines that the user is authorized to access the requested services, the services are provided. If the user is determined to not be authorized, programming access to the services is denied, and an error message sent advising the user that the SIM 4 has not been authorized to access the requested services.

The request for services and the sending of the error message, as well as the providing of the services, is typically transmitted over network 16. Network 16 may be any of a variety of network types, including, but not limited to, the Internet, a community antennae television coaxial network, an optical fiber network, or a wireless network, any and all of which will be known to those skilled in the art.

NIU 6 transmits and receives signals and messages from network 16 and interfaces with one or more user interface devices, such as, for example, a computer 18, a telephone 20, a television 22, or a PDA 24. Communication between NIU 6 and these user devices will typically be provided over local area network ("LAN") 25, which may be, for example, an Ethernet network or other LAN type that will be known to those skilled in the art. NIU 6 will typically have a SIM interface device 26, known in the art, for receiving SIM card 4 and connecting it to the internal circuitry of the NIU, thereby facilitating the transfer of stored information from the SIM card to the NIU. Interface 26 may allow for external insertion and removal of SIM 4 by a user, or may be internal to NIU 6 so that insertion and removal is performed by the provider.

Figure 2:
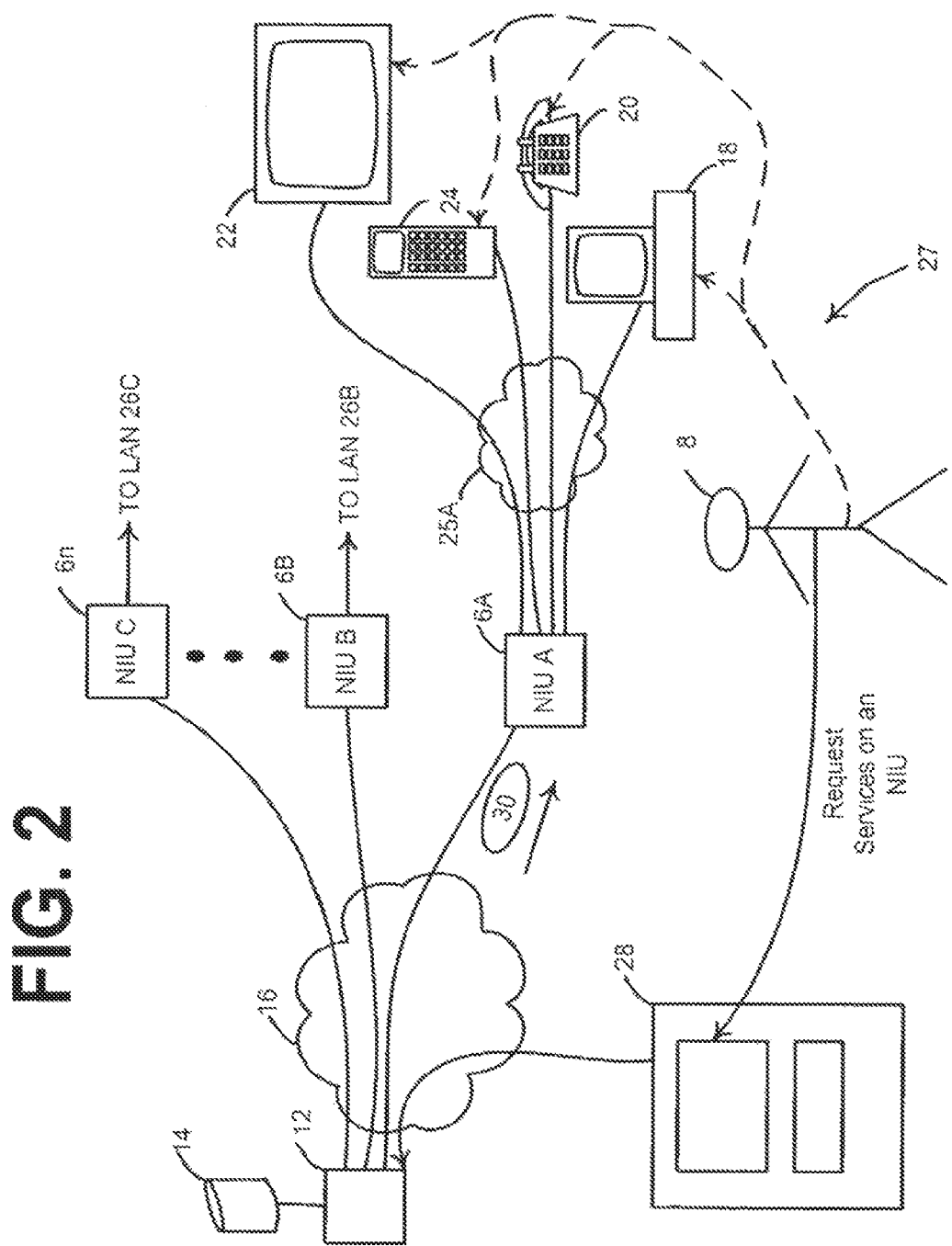
FIG. 2 illustrates a system for facilitating transporting user account information from one location to another to obtain desired services at a plurality of locations using a virtual SIM.

Turning now to FIG. 2, system 27 facilitates the establishing of a virtual SIM in any one or more of NIUs 6. For example, instead of having a physical SIM device, as shown in FIG. 1, user 8 inputs service request information to kiosk 28, including credit card, or other form of payment, account information, including cash inserted into the kiosk device. Upon verification of the user's identity (either the user is an existing customer or registered user in the provider's database 14, or the user establishes a new account and profile with the provider 12), using a username and password, or biometrics, for example, and verification that adequate funds are available, provider 12 downloads a message 30 to one or more of the NIUs 6. The particular NIUs 6 to which message 30 is sent are NIUs specified by user 8. If user 8 is an existing customer/subscriber of provider 8, a list a NIUs 6 associated with the user may appear as a drop down box, list box, or other interface device known in the art. If user 8 is not an existing customer, the user will typically enter identifiers of the NIUs 6, the NIU identifier being a serial number, for example, that is not on record with the provider 12, from which requested services are to be established.

When user 8 attempts to access any of the requested services, such as, for example, a pay-for-view program on television 22 or telephone services on telephone 20, NIU 6 would check the information carried by message 30 and stored in the NIU to determine if such services are authorized. Thus, a password or other access control methods known in the art are not required. This is advantageous because the access control is provided directly at the NIU 6, rather than having passwords and other sensitive personal information being transmitted across network 16. This saves time, server resources at server 12, and reduces the chance that the sensitive information could be compromised along public network 16. Furthermore, sensitive information need not even reside on the NIU 6, because the information carried in message 30 and stored at the NIU is essentially go/no-go (gatekeeping) information corresponding to each of the services requested and authorized by the user. Typically, the only time sensitive information is exposed to network 16 is when user 8 is establishing the services 'credit' at kiosk 28.

In addition to establishing services credit at kiosk 28, which may be located in public locations, it will be appreciated that the virtual SIM functionality can be requested and established from any of the user devices connected to LAN 25A, or any other network that is configured to transmit data to provider 12. This includes using a personal computer ("PC") connected to the Internet at any location. Furthermore, user 8 can also speak with a representative on the telephone in person to either establish a new services account or to replenish and/or alter an existing account. It will be appreciated that systems and methods known in the art for providing secure transmitting of information will typically be used. These include, but are not limited to, hash functions, data encryption and secure sockets layer technology, etc.

Figure 3:
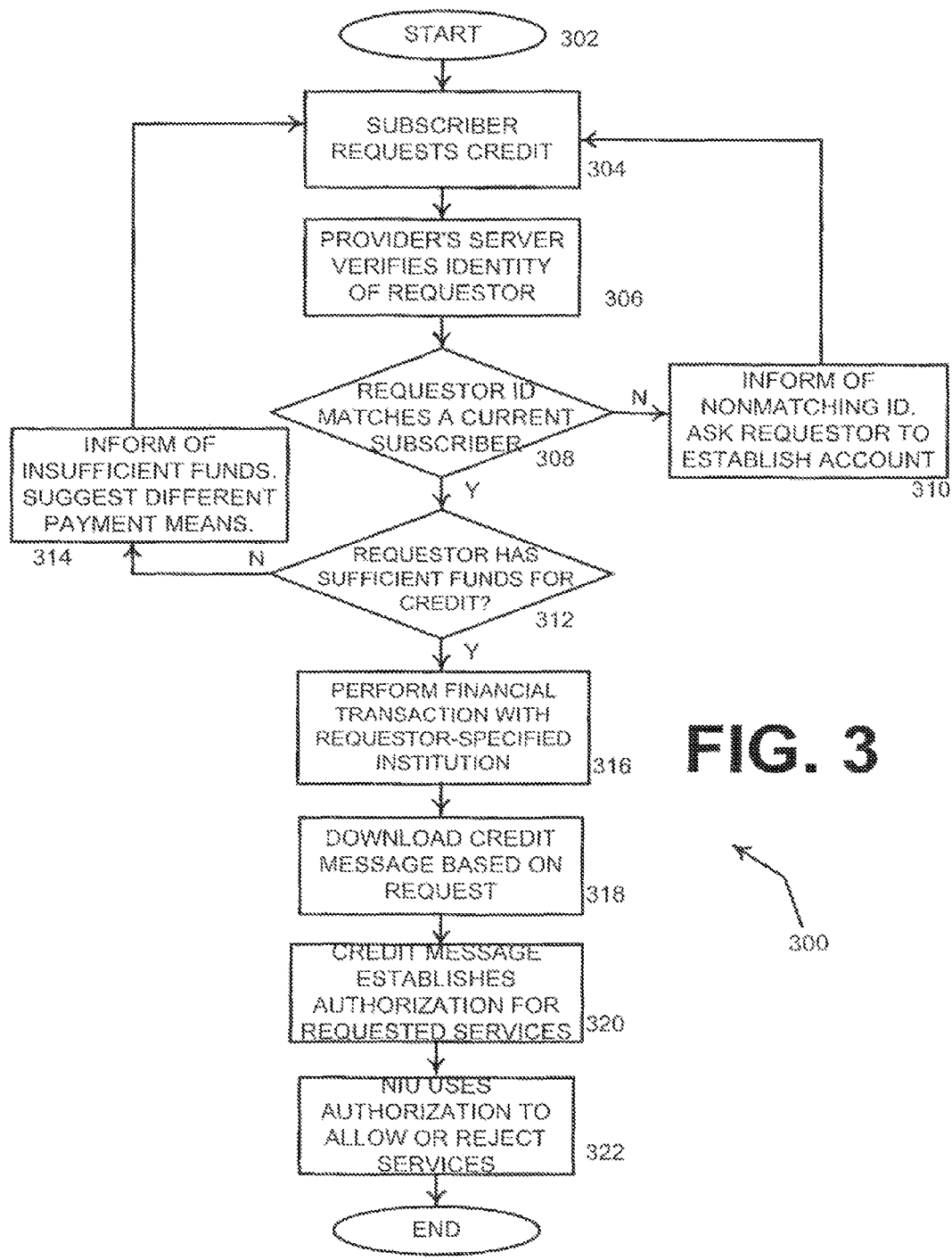
FIG. 3 illustrates a flow diagram of a method for facilitating user account information from one location to another to obtain desired services at a plurality of locations using a SIM.

Turning now to FIG. 3, a flow diagram showing the steps in programming a SIM with desired services and levels thereof, as well as the amount of money (which typically is proportional to the length of given subscriptions requested and the levels thereof), is illustrated. The steps shown are applicable to an aspect that uses a physical SIM as well as an aspect that uses virtual SIM functionality.

After routine 300 starts at step 302, a user enters a request for services from a service provider at step 304. This request may be performed at a stand-alone kiosk in a public location, at the provider's place of business, or at a variety of remote locations using a variety interface devices, such as, for example, a PC, a mobile telephone, a landline telephone, or any other fixed or portable device known in the art, with access to a communication network. As part of the request for service, the user will typically be queried for an identifier, such as, for example, a username and password, or a biometric identifier, such as a thumbprint, or other such means known in the art. If the SIM has a unique identifier associated with it, the identifier can be used and no further identification input would be needed from the user.

At step 306, the service provider checks the user-provided identifier to determine whether the user has an established account with the provider. This check may be performed manually, such as would be the case if the user had called the provider's representative using a telephone and verbally placed the request with said representative. The check at step 306 may also be performed automatically upon the provider's server receiving the user-provided identifier, or the SIM identifier.

Upon receiving the user-provided identifier, if the provider determines at step 308 that the user does not have an established account, a message is sent to the requesting user at step 310 informing said user that the identification information does not match any user information currently stored in the provider's database. The message may further inform the requestor that he or she may elect to establish an account, upon such election the routine would return to step 304.

To establish credit at step 304, the user will typically provide billing information, such as, for example, a credit card number, name, address, telephone number, etc. In addition, a personal profile, or suite of services, may be established, including the services requested, and the level and location of these services.

For example, if a household has four televisions, three PCs and five telephones (including two separate numbers), the telephone in a child's room may have restricted access after a certain time of day, all televisions except one may have restricted access to certain channels, and data provided to the PCs may have certain content blocked. Moreover, a user may establish more than one physical location for receiving services. If a user has a primary and a secondary residence, separate profiles may be established for each location, the NIU at each location having functionality to provide a NIU identifier, such as, for example, a serial number. If the primary residence is the household described above, and the secondary residence is a vacation house on a beach, the beach house may only have one television and one telephone and no PC. Thus, each profile may be customized for use with a particular NIU, based on the NIU identifier.

Another scenario contemplates that at a particular location, multiple users may periodically use the same network devices connected to the same NIU. Such would be the case with a time-share condominium, for example. If the condominium has a different user every week, month or other period of time, each user may have their own SIM, or virtual SIM, associated with their billing account and preferred suite of services. Thus, temporary service does not have to be established for each user before the condominium usage period begins, and cancelled after the period ends.

After the provider has determined that the requestor has an established account, the provider determines whether the requestor has sufficient payment capability based on the currently established payment and billing information at step 312. The established customer with an established account may have credit existing in the services account. This scenario may arise when an existing customer wishes to change the preferences indicated in the one or more profiles associated with that user. If the established user does not have sufficient credit, or if a verification check of a new user's credit card account (or other payment means) indicates that the billing information does not have sufficient credit or the account number or billing address is incorrect, then a message is sent at step 314 to the user informing him or her that either an authorization to charge additional funds must be made, or a different means of payment must be provided.

If the account has sufficient funds for the requested change in services, the provider performs a financial transaction with the user-provided and authorized financial institution, debiting the user's account at step 316. When the provider has determined that sufficient funds have been, or will be, transferred to the provider in connection with the user's request, then the provider downloads a message to the user's SIM means at step 318. As discussed above, the user's SIM means may be an actual SIM card or other physical device that contains memory and possibly processing means, or SIM card functionality may be implemented in software and/or firmware within an NIU, this functionality being referred to as a 'virtual SIM.' The downloading of the message at step 318 will typically be performed over a secure network, as credit having a cash value with respect to a provider will be established in the SIM means at step 320.

This credit can then be used at step 322 by an NIU into which the SIM means is inserted, or resides, to grant access to the services requested at step 304. Alternatively, if the SIM is a virtual SIM, the NIU with respect to which the credit has been requested can grant access to the requested services as long as the credit established at step 322 has not expired or been consumed.

It will be appreciated by those skilled in the art that the SIM card may also be non-renewable, this type typically being purchased in prepaid cash amounts for predetermined services, such as telephony. While this type of SIM card may not be flexible with respect to the suite of services and the customization thereof, ease of use is provided. For example, in the condominium example described above, the only service having a variable cost, based upon usage level, may be telephony, cable television, for example, being a fixed amount that can be easily calculated into the price of ownership/rental. The same would apply to telephony services in a hotel. Thus, a prepaid card that only authorizes telephony may be desirable.

These and many other objects and advantages will be readily apparent to one skilled in the art from the foregoing specification when read in conjunction with the appended drawings. It is to be understood that the embodiments herein illustrated are examples only, and that the scope of the disclosure is to be defined solely by the claims when accorded a full range of equivalents.

What is claimed is:

1. A method for providing portability of a suite of subscription services between a plurality of network interface units, comprising:
   processing at a service provider a request for the services received from a user device coupled to one of the network interface units, the request containing a unique identifier retrieved from and corresponding to a SIM device coupled to the one of the network interface units;
   processing at the service provider account and billing information to be used for payment of the services, the account and billing information being received from the SIM device coupled to the one of the network interface unit;
   generating at the service provider a credit message that credit for the suite of services has been granted, the message being capable of authorizing the network interface unit to grant access to any of the requested services when the SIM device is used in the network interface unit; and
   downloading the credit message to the SIM device.

2. The method of claim 1 wherein the SIM device does not grant access to all of the requested services at a given user device coupled to the network interface device based on a subscriber profile that restricts access to certain content at the given user device.

3. A system comprising:
   an interface at a service provider operable to receive a request for subscription services from a user device;
   an authorization module at the service provider operable to process the request for subscription services received from the user device having a SIM device coupled to a network interface unit, wherein the request includes a unique identifier associated with the SIM device coupled to the network interface unit;
   an account management module operable to electronically process account and billing information received from the SIM device via the user device, the account and billing information to be used as payment for the subscription services, the account and billing information being associated with the unique identifier associated with the SIM device coupled to the network interface unit;
   wherein the authorization module is operable to generate a credit message approving access to the subscription services, the credit message being capable of authorizing the network interface unit to grant access to any of a plurality of authorized subscription services by the user device when the SIM device is used in the network interface unit at the user device; and
   wherein the interface is operable to transmit the credit message to the SIM device via the user device and network interface unit.

4. The system of claim 3, wherein the credit message is communicated from a headend location to a SIM device location over a network.

5. The system of claim 4, wherein the SIM device location at which the message is received is different than a network interface unit location of one or more of the plurality of network interface units where the subscription services can be retrieved.

6. The system of claim 5, wherein the SIM device location at which the message is received is the same as a network interface unit location associated with the network interface unit.

7. The system of claim 3, wherein the authorization module is further operable to generate a denial message indicating that access to subscription services by the SIM device is denied, and the interface is operable to transmit the denial to the SIM device location.

* * * * *